US011487338B2

United States Patent
Ma et al.

(10) Patent No.: US 11,487,338 B2
(45) Date of Patent: Nov. 1, 2022

(54) VOLTAGE-FOLLOWING SERIES POWER SUPPLY CIRCUIT, AND HASH BOARD AND COMPUTING DEVICE APPLIED THERETO

(71) Applicants: Hangzhou Canaan Intelligence Information Technology Co, Ltd, Hangzhou (CN); CANAAN CREATIVE CO., LTD., Beijing (CN)

(72) Inventors: Jiakun Ma, Beijing (CN); Nangeng Zhang, Beijing (CN)

(73) Assignees: Hangzhou Canaan Intelligence Information Technology Co, Ltd, Hangzhou (CN); CANAAN CREATIVE CO., LTD., Beijing (CN)

( * ) Notice: Subject to any disclaimer, the term of this patent is extended or adjusted under 35 U.S.C. 154(b) by 0 days.

(21) Appl. No.: 16/980,315

(22) PCT Filed: Jun. 17, 2019

(86) PCT No.: PCT/CN2019/091568
§ 371 (c)(1),
(2) Date: Sep. 11, 2020

(87) PCT Pub. No.: WO2020/001312
PCT Pub. Date: Jan. 2, 2020

(65) Prior Publication Data
US 2021/0124406 A1 Apr. 29, 2021

(30) Foreign Application Priority Data
Jun. 29, 2018 (CN) .......................... 201810706152.1

(51) Int. Cl.
*G06F 1/30* (2006.01)
*H02M 1/32* (2007.01)
(Continued)

(52) U.S. Cl.
CPC ................ *G06F 1/30* (2013.01); *H02M 1/32* (2013.01); *H04L 9/0643* (2013.01); *H04L 9/50* (2022.05)

(58) Field of Classification Search
CPC .......... G06F 1/30; H02M 1/32; H04L 9/0643; H04L 2209/38
See application file for complete search history.

(56) References Cited

U.S. PATENT DOCUMENTS

2013/0207695 A1* 8/2013 Jeon ........................ H02J 9/061
327/109
2018/0262106 A1* 9/2018 Chakkirala ........... H02M 3/158
(Continued)

FOREIGN PATENT DOCUMENTS

CN 105045364 A 11/2015
CN 106383566 A * 2/2017
(Continued)

OTHER PUBLICATIONS

International Search Report dated Sep. 18, 2019 in related International Application No. PCT/CN2019/091568.
(Continued)

*Primary Examiner* — Aurel Prifti
(74) *Attorney, Agent, or Firm* — Maschoff Brennan

(57) ABSTRACT

The invention provides a voltage-following series power supply circuit, comprising a power supply end and a ground end; a power supply module comprising an input end connected to the power supply end, and an output end for providing a power supply to two or more to-be-powered chips, the power supply module and the to-be-powered chips connected in series between the power supply end and the ground end; and at least one auxiliary power supply module for supplying an auxiliary power supply to the to-be-powered chips, wherein a voltage following module is further connected between the power supply end and the auxiliary power supply module for adjusting a voltage of the auxiliary power supply.

12 Claims, 3 Drawing Sheets

(51) Int. Cl.
*H04L 9/06* (2006.01)
*H04L 9/00* (2022.01)

(56) References Cited

U.S. PATENT DOCUMENTS

| | | | |
|---|---|---|---|
| 2018/0299937 A1* | 10/2018 | Nguyen | G06F 1/263 |
| 2019/0310691 A1* | 10/2019 | Ahn | H05K 7/20309 |
| 2021/0263575 A1* | 8/2021 | Liu | G11C 5/147 |

FOREIGN PATENT DOCUMENTS

| | | | | |
|---|---|---|---|---|
| CN | 106383566 A | 2/2017 | | |
| CN | 107947566 A | 4/2018 | | |
| CN | 108809068 A | 11/2018 | | |
| CN | 208608891 U | 3/2019 | | |
| JP | H0795765 A | 4/1995 | | |
| WO | WO-2017012371 A1 * | 1/2017 | | G06F 1/26 |
| WO | 2017074375 A1 | 5/2017 | | |
| WO | WO-2019119963 A1 * | 6/2019 | | G06F 1/26 |
| WO | WO-2019120295 A1 * | 6/2019 | | G06F 1/26 |

OTHER PUBLICATIONS

European Search Report for European Patent Application No. 19826421.0 dated Feb. 1, 2022.

* cited by examiner

VOLTAGE-FOLLOWING SERIES POWER SUPPLY CIRCUIT, AND HASH BOARD AND COMPUTING DEVICE APPLIED THERETO

BACKGROUND OF THE INVENTION

1. Field of the Invention

The invention relates to a series power supply circuit, and particularly to a voltage-following series power supply circuit, and a hash board and a computing device applied thereto.

2. Related Art

As for computing devices that need a large number of high speed operations, such as, current Bitcoin mining machines, a plurality of hash chips are connected in series to a printed circuit board, and most of the hash chips adopt series power supply mode. When the series power supply mode is adopted, a power supply of the hash chip of each stage may be viewed as ground of the preceding-stage hash chip, and the ground of the hash chip of each stage may be viewed as a power supply of the next-stage hash chip.

Since voltages of the power supply and the ground of the calculating chip of each stage are different, how to power IO of the chips of the present stage becomes a tough problem. With respect to the subsequent cascaded calculating chips, it is possible to adopt the way of taking power from the calculating chips connected in series every few stages for use of IO power supply of the present stage. However, as for several foremost stages, due to the problem of input voltage drop, only other methods can be adopted.

FIG. 1 illustrates a current series power supply circuit. As shown in FIG. 1, the current series power supply circuit 100 comprises a power supply end 101, a power supply module 102, n to-be-powered chips 103-$n$, m auxiliary power supply modules 104-$m$, a voltage booster power supply module 105 and a ground end 106. The power supply module 102 and the n to-be-powered chips 103-$n$ are sequentially connected in series to the power supply end 101 and the ground end 106. The power supply end 101 supplies a power supply voltage VCC to the circuit, and the ground end 106 supplies a ground GND for the circuit. The power supply module 102 output a voltage $V_{core}$ to supply series power to the to-be-powered chip 103-$n$. The m-th auxiliary power supply module 104-$m$ supplies power to IO of the to-be-powered chips of the previous m stages. The auxiliary power supply module 104-$m$ can be directly powered by the power supply voltage VCC of the power supply end 101, and also can supply the power supply voltage VCC after voltage boosting of the voltage booster power supply module 105 to the auxiliary power supply module 104-$m$.

Although the series power supply circuit 100 shown in FIG. 1 can supply series power to the to-be-powered chips, there are still deficiencies: (1) when the power supply voltage VCC directly powers the auxiliary power supply modules, and a voltage difference between the power supply voltage VCC and $V_{core}$ is small, the auxiliary power supply modules cannot work normally; (2) when the auxiliary power supply modules are powered after voltage boosting of the voltage booster power supply module, due to the requirement for variable frequency, $V_{core}$ is adjusted, when $V_{core}$ is decreased, the voltage difference between the voltage outputted from the voltage booster power supply module and $V_{core}$ gets larger, and may exceed a normal working voltage of the to-be-powered chips, such that the auxiliary power supply modules cannot work normally; (3) no matter whether the auxiliary power supply modules are directly powered by the power supply voltage VCC, or powered after voltage boosting of the voltage booster power supply module, when $V_{core}$ does not exist, the power supply voltage VCC or the voltage booster power supply module directly powers IO ends of the to-be-powered chips, causing the to-be-powered chips to be burnt down.

SUMMARY OF THE INVENTION

To solve the above problems, the invention provides a voltage-following series power supply circuit, which can avoid the to-be-powered chips from exceeding the normal working voltage, even being burnt down, and also can decrease a power supply current, optimize power conversion efficiency, and reduce power consumption.

To realize the above object, the invention provides a voltage-following series power supply circuit, comprising:

a power supply end and a ground end;

a power supply module comprising an input end connected to the power supply end, and an output end for providing a power supply to two or more to-be-powered chips, the power supply module and the to-be-powered chips connected in series between the power supply end and the ground end; and at least one auxiliary power supply module for supplying an auxiliary power supply to the to-be-powered chips, wherein a voltage following module is further connected between the power supply end and the auxiliary power supply module for adjusting a voltage of the auxiliary power supply.

In the voltage-following series power supply circuit, the voltage following module adjusts the voltage of the auxiliary power supply according to a voltage at the output end of the power supply module.

In the voltage-following series power supply circuit, the voltage at the output end of the power supply module is configured to supply a reference voltage to the voltage following module.

In the voltage-following series power supply circuit, the voltage following module comprises a power supply input end, a ground input end, a power supply output end, a comparing amplifier unit, a sampling unit, a reference voltage generating unit and a switching unit.

In the voltage-following series power supply circuit, the power supply input end is connected to the power supply end, the ground input end is connected to the output end of the power supply module, and the power supply output end is connected to the auxiliary power supply module.

In the voltage-following series power supply circuit, the switching unit is connected to the power supply input end and the power supply output end, and the comparing amplifier unit controls the switching unit to turn on or turn off.

In the voltage-following series power supply circuit, the sampling unit comprises a first resistor and a second resistor connected in series; a first end of the first resistor is connected to the power supply output end, and a second end is connected to a first end of the second resistor; a second end of the second resistor is connected to the ground input end; the second end of the first resistor and the first end of the second resistor are connected to a positive input end of the comparing amplifier unit.

In the voltage-following series power supply circuit, the reference voltage generating unit is connected to the power supply input end and the ground input end, and supplies a reference voltage to a negative input end of the comparing amplifier unit.

In the voltage-following series power supply circuit, the switching unit comprises a switching transistor.

In the voltage-following series power supply circuit, the switching transistor is a PMOS switching transistor.

In the voltage-following series power supply circuit, the voltage following module comprises standard LDO chips.

In the voltage-following series power supply circuit, it further comprises a voltage booster power supply module connected between the power supply end and the voltage following module.

To realize the above object, the invention further provides a hash board for a computing device, the hash board supplying a power supply using any of the voltage-following series power supply circuits.

To realize the above object, the invention further provides a computing device, comprising a power supply plate, a control board, a connection board, a radiator and a plurality of hash boards, the control board connected to the hash boards through the connection board, the radiator provided around the hash boards, the power supply plate for supplying a power supply to the connection board, the control board, the radiator and the hash boards, wherein the hash board is any of the hash boards.

The computing device can be configured to operation of mining virtual digital currency.

Application of the voltage-following series power supply circuit of the invention can avoid the possibility of the to-be-powered chips from exceeding the normal working voltage, even being burnt down, and also can decrease a power supply current, optimize power conversion efficiency, and reduce power consumption.

Hereinafter the invention is described in detail with reference to the accompanying drawings and the detailed embodiments, but the invention is not limited thereto.

DETAILED DESCRIPTION

Hereinafter structure principle and working principle of the invention are described in detail with reference to the accompanying drawings.

Specific terms are used in the specification and the subsequent claims to refer to specific components. Those skilled in the art shall understand that the manufacturer may give a different name to the same component. The specification and the subsequent claims distinguish components from each other by different functions of the components, instead of different names. In the whole specification, the same reference sign represents the same element.

"Comprise" and "include" mentioned in the whole specification and the subsequent claims are open words, and shall be explained as "include but is not limited to". In addition, "connection" herein includes any direct or indirect electrical connection means. Indirect electrical connection means comprises connection through other devices.

Figure 1:
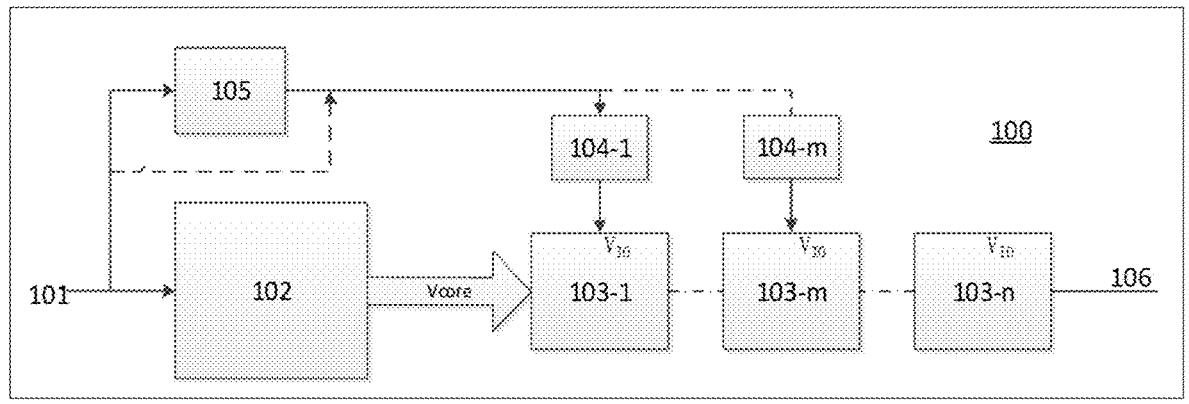
FIG. 1 is a schematic diagram of a current series power supply circuit.
Figure 2:
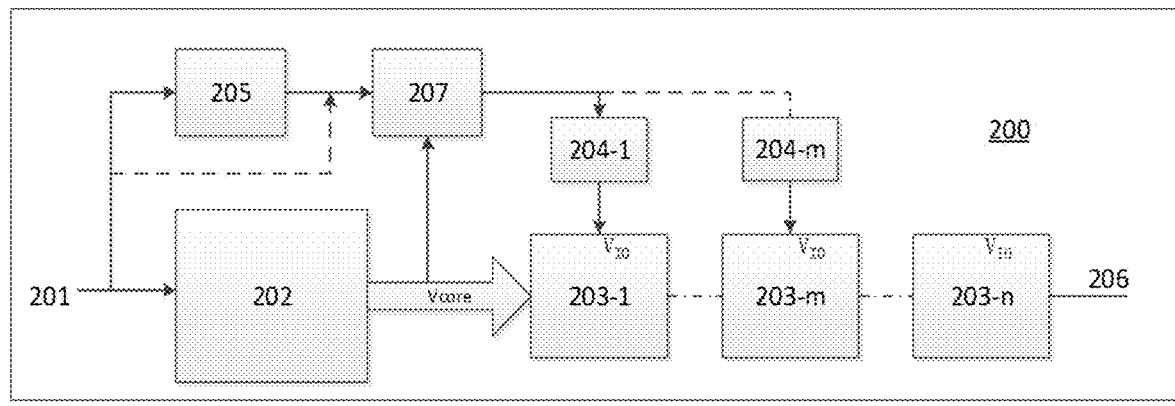
FIG. 2 is a schematic diagram of a voltage-following series power supply circuit according to the invention.

FIG. 2 is a schematic diagram of a voltage-following series power supply circuit according to the invention. As shown in FIG. 2, the voltage-following series power supply circuit 200 comprises a power supply end 201 and a ground end 206, wherein the power supply end 201 is connected to a system power supply VCC, and the ground end 206 is connected to a system ground GND; a power supply module 202, comprising an input end connected to the power supply end 201, and an output end for providing a power supply $V_{core}$ to to-be-powered chips, wherein the to-be-powered chips 203-1 ... 203-n are plural, such as, n, where n is a positive integer greater than 1. The to-be-powered chips 203-1 ... 203-n are connected in series, wherein a power supply of the 1st stage to-be-powered chip 203-1 is connected to the output end of the power supply module 202, the ground end of the 1st stage to-be-powered chip 203-1 is connected to a power supply of the next-stage to-be-powered chip 203-2, and so on. A power supply of the to-be-powered chip of the present stage is ground of the preceding-stage to-be-powered chip, and the ground of the to-be-powered chip of the present is a power supply of the next-stage to-be-powered chip The ground of the to-be-powered chip 203-n of the final stage is connected to the ground end 206. It shall be noted that in the invention, the to-be-powered chips 203-1 ... 203-n can be single data processing chips, and also can be a chip ground formed by connecting a plurality of data processing chips in parallel, but the invention is not limited thereto.

The voltage-following series power supply circuit 200 further comprises a plurality of auxiliary power supply modules 204-1 ... 204-m, such as, m, where 1≥m≥n, and m is a positive integer. The auxiliary power supply modules 204-1 ... 204-m supply power to IO ends of the to-be-powered chips 203-1 ... 203-n of the preceding m stages.

Generally, for example, a working voltage of the to-be-powered chips 203-1 ... 203-n can be 0.4V, and a working voltage of the auxiliary power supply modules 204-1 ... 204-m is 1.8V. When a voltage at the output end of the power supply module 202 is $V_{core}$, a power supply voltage of the to-be-powered chip 203-1 is $V_{core}$, and a ground voltage is $V_{core}$–0.4; the power supply voltage of the m-th stage to-be-powered chip is $V_{core}$–0.4*(m–1), and the ground voltage is $V_{core}$–0.4*m.

To ensure the auxiliary power supply modules 204-1 ... 204-m to work normally, the power supply voltage of the auxiliary power supply modules 204-1 ... 204-m shall be at least the ground voltage of the to-be-powered chips 203-1 ... 203-n and the working voltage 1.8V of the auxiliary power supply modules, i.e., $V_{core}$–0.4+1.8 ... $V_{core}$–0.4*m+1.8.

Considering that internal resistances of the to-be-powered chips of respective stages are different, and in order to ensure the auxiliary power supply modules to work normally, the system power supply VCC often powers the auxiliary power supply modules after voltage boosting. Taking $V_{core=}10V$ and m=5 for example, the system power VCC often powers the auxiliary power supply modules after a voltage booster power supply module 205 boosts the voltage to 14V. Accordingly, a voltage at both ends of the m-th stage auxiliary power supply module 204-m is 14–(10–0.4*5) =6V, and after subtracting a working voltage 1.8V of the auxiliary power supply module 204-m, the voltage at both ends of the auxiliary power supply module 204-m is still higher than the voltage at normal working by 6–1.8=4.2V.

When the to-be-powered chips are tuned, the voltage at the output end of the power supply module 202 shall be adjusted, for example, adjusting the voltage $V_{core}$ to 8V.

Accordingly, the voltage at both ends of the m-th stage auxiliary power supply module 204-m is 14−(8−0.4*5)=8V, and after subtracting the working voltage 1.8V of the auxiliary power supply module 204-m, the voltage at both ends of the auxiliary power supply module 204-m is increased to 8−1.8=6.2V higher than the voltage at normal working. Accordingly, the voltage may exceed a safe working voltage of the auxiliary power supply module 204-m, even the to-be-powered chip 203-m, causing the chip to be burned down.

Based on the foregoing reasons, the voltage-following series power supply circuit 200 of the invention adds a voltage follower module 207 between the voltage booster power supply module 205 and the auxiliary power supply modules 204-1 . . . 204-m.

Figure 3:
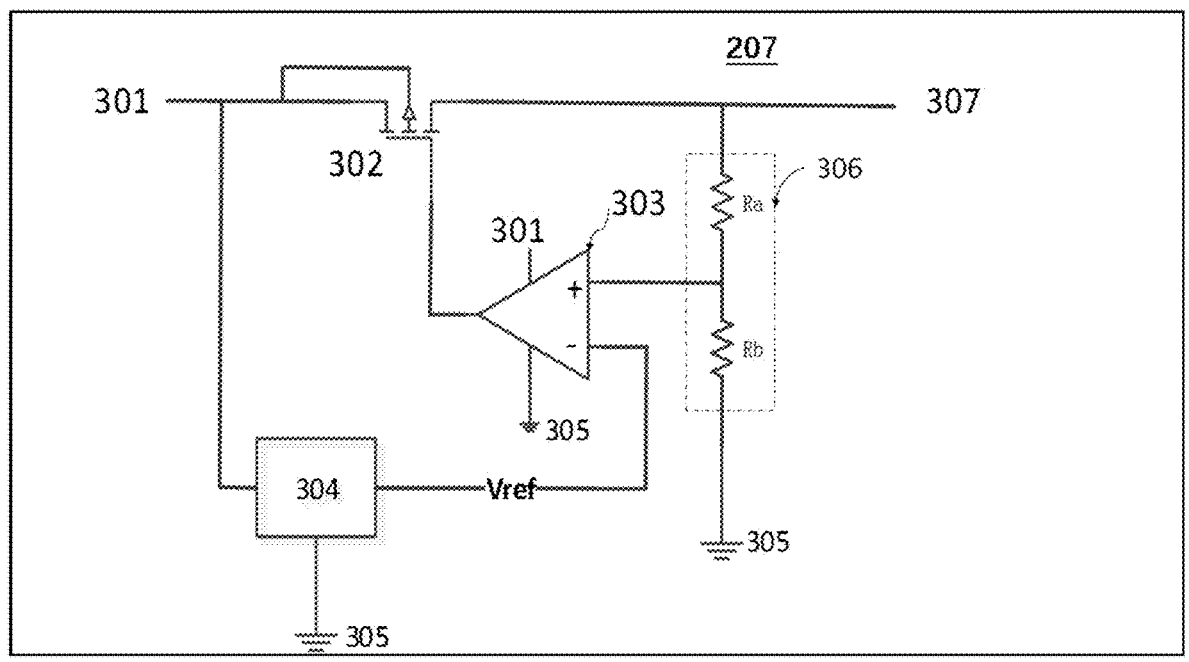
FIG. 3 is a circuit structural diagram of a voltage following module according to the invention.

FIG. 3 is a circuit structural diagram of a voltage following module according to the invention. Referring to FIGS. 3 and 2, the voltage follower module 207 comprises a power input end 301, a switching unit 302, a comparing amplifier unit 303, a reference voltage generating unit 304, a ground input end 305, a sampling unit 306 and a power output end 307. The power input end 301 is connected to the power end 201 of the voltage-following series power supply circuit 200, or connected to an output end of the voltage booster power supply module 205. The ground input end 305 is connected to an input end of the power supply module 202, such that a voltage of the power output end 307 varies along with the voltage $V_{core}$ at the output end of the power supply module 202, and a difference between the voltage of the power output end 307 and the voltage $V_{core}$ keeps constant, thereby ensuring the voltage at both ends of the auxiliary power supply modules 204-1 . . . 204-m to be always within a range of the safe working voltage.

The switching unit 302 is connected between the power input end 301 and the power output end 307, and is controlled to turn on or turn off by an output end of the comparing amplifier unit 303. The switching unit 302 can be a PMOS transistor. A source electrode of the PMOS transistor is connected to the power input end 301, a drain electrode is connected to the power output end 307, and a gate electrode is connected to the output end of the comparing amplifier unit 303.

The comparing amplifier unit 303 can be an operational amplifier with a power supply connected to the power input end 301, and ground connected to the ground input end 305. According to the safe working voltages of the auxiliary power supply modules 204-1 . . . 204-m and/or the to-be-powered chips 203-1 . . . 203-n, a voltage value of a reference voltage $V_{ref}$ generated by the reference voltage generating unit 304 is set, and the reference voltage $V_{ref}$ generated by the reference voltage generating unit 304 serves as a negative input end of the comparing amplifier unit 303.

The sampling unit 306 is connected between the power output end 307 and the ground input end 305, and can be two resistors $R_a$ and $R_b$ connected in series. One end of the resistor $R_a$ is connected to the power output end 307, and the other end is connected to one end of the resistor $R_b$. The other end of the resistor $R_b$ is connected to the ground input end 305. The other end of the resistor $R_a$ and one end of the resistor $R_b$ are connected to a positive input end of the comparing amplifier unit 303.

Assuming that an output voltage of the power output end 307 is $V_{out}$, a voltage at the positive input end of the comparing amplifier unit 303 is $(V_{out}-V_{core})*R_b/(R_a+R_b)$, and when $(V_{out}-V_{core})*R_b(R_a+R_b)<V_{ref}$, an output of the comparing amplifier unit 303 is "0". Accordingly, the switching unit 302 is turned on to connect the power input end 301 and the power output end 307, the power output end 307 charges a load capacitor, and the output voltage $V_{out}$ of the power output end 307 is increased. When the voltage of the power output end 307 is increased to $(V_{out}-V_{core})*R_b/(R_a+R_b)>V_{ref}$, the output of the comparing amplifier unit 303 is "1", the switching unit 302 is turned off, and the load capacitor of the power output end 307 discharges, such that the voltage of the power output end 307 is decreased. Therefore, $(V_{out}-V_{core})*R_b/(R_a+R_b)$ can be equal to $V_{ref}$, i.e., $V_{out}=V_{core}+V_{ref}*(1+R_a/R_b)$. In other words, the voltage of the power output end 307 of the voltage following module 207 varies along with the voltage $V_{core}$ at the output end of the power supply module 202, thereby ensuring that the auxiliary power supply modules 204-1 . . . 204-m and the to-be-powered chips 203-1 . . . 203-n always work within the range of the safe working voltage.

The voltage following module of the invention can be separately encapsulated using the circuit structure of the voltage following module shown in FIG. 3, and also can be encapsulated together with other circuits.

Figure 4:
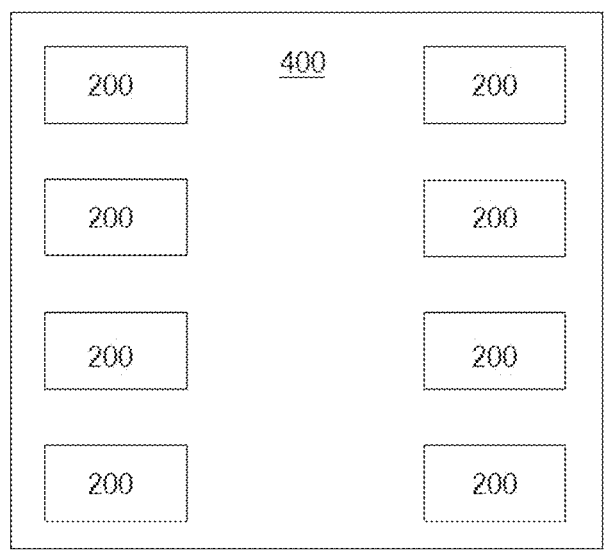
FIG. 4 is a structural diagram of a hash board according to the invention.

The invention further provides a hash board, and FIG. 4 is a structural diagram of a hash board according to the invention. As shown in FIG. 4, each of the hash boards 400 comprises one or more voltage-following series power supply circuits 200 to perform hash operation on working data sent downstream from a mining pool.

Figure 5:
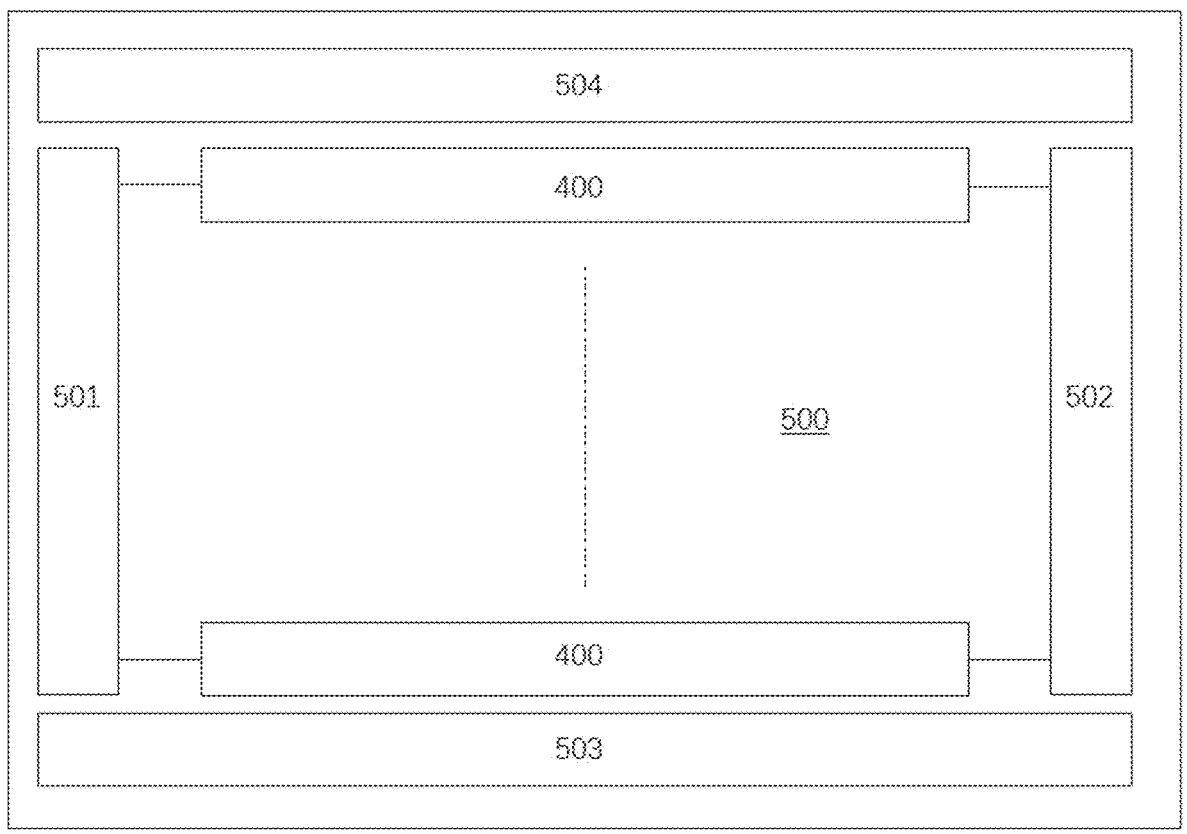
FIG. 5 is a structural diagram of a computing device according to the invention.

The invention further provides a computing device, and the computing device is preferably configured to operation of mining virtual digital currency. Of course, the computing device also can be configured to any other massive operations, and FIG. 5 is a schematic diagram of a computing device according to the invention. As shown in FIG. 5, each of the computing devices 500 comprises a connection board 501, a control board 502, a radiator 503, a power supply plate 504 and one or more hash boards 400. The control board 502 is connected to the hash boards 400 through the connection board 501, and the radiator 503 is provided around the hash boards 400. The power supply plate 504 is configured for supplying a power supply to the connection board 501, the control board 502, the radiator 503 and the hash boards 400.

It shall be noted that in the invention, orientation or positional relationship indicated by the terms "transverse", "longitudinal", "up", "down", "front", "back", "left", "right", "vertical", "horizontal", "top", "bottom", "in", "out", and the like is the orientation or positional relationship illustrated by the drawings, and is only for the purpose of describing the invention and simplifying the explanation, rather than indicating or suggesting that the referred device or element must have specific orientation, and be constructed and operated in specific orientation, so it shall not be understood as limits to the invention.

Although the embodiments of the invention have been disclosed above, they can be fully applied to various fields suitable for the invention but not as limits to those listed in the specification and the embodiments. For those skilled in the art, additional modifications can be easily implemented, so without departing from general concepts defined by the appended claims and equivalent scopes, the invention is not limited to specific details and figures illustrated and described here.

In other words, the invention also may have various other embodiments, and those skilled in the art shall make various corresponding modifications and variations according to the invention without departing from spirit and essence of the invention, but these corresponding modifications and variations shall belong to the scope protected by the appended claims of the invention.

Application of the voltage-following series power supply circuit and the hash board and the computing device applied thereto of the invention has the following advantageous effects:

capable of avoiding the possibility of the to-be-powered chips from exceeding the normal working voltage, even being burnt down, decreasing a power supply current, optimizing power conversion efficiency, and reducing power consumption.

What is claimed is:

1. A voltage-following series power supply circuit, comprising:
    a power supply end and a ground end;
    a power supply module comprising an input end connected to the power supply end, and an output end for providing a power supply to two or more to-be-powered chips,
    the power supply module and the to-be-powered chips connected in series between the power supply end and the ground end; and
    at least one auxiliary power supply module for supplying an auxiliary power supply to the to-be-powered chips,
    wherein a voltage following module is further connected between the power supply end and the auxiliary power supply module for adjusting a voltage of the auxiliary power supply;
    wherein the voltage following module comprises a power supply input end, a ground input end, a power supply output end, a comparing amplifier unit, a sampling unit, a reference voltage generating unit and a switching unit;
    the switching unit is connected to the power supply input end and the power supply output end, and the comparing amplifier unit controls the switching unit to turn on or turn off.

2. The voltage-following series power supply circuit according to claim 1, wherein the voltage following module adjusts the voltage of the auxiliary power supply according to a voltage at the output end of the power supply module.

3. The voltage-following series power supply circuit according to claim 2, wherein the voltage at the output end of the power supply module is configured to supply a reference voltage to the voltage following module.

4. The voltage-following series power supply circuit according to claim 1, wherein the power supply input end is connected to the power supply end, the ground input end is connected to the output end of the power supply module, and the power supply output end is connected to the auxiliary power supply module.

5. The voltage-following series power supply circuit according to claim 1, wherein the sampling unit comprises a first resistor and a second resistor connected in series; a first end of the first resistor is connected to the power supply output end, and a second end is connected to a first end of the second resistor; a second end of the second resistor is connected to the ground input end; the second end of the first resistor and the first end of the second resistor are connected to a positive input end of the comparing amplifier unit.

6. The voltage-following series power supply circuit according to claim 5, wherein the reference voltage generating unit is connected to the power supply input end and the ground input end, and supplies a reference voltage to a negative input end of the comparing amplifier unit.

7. The voltage-following series power supply circuit according to claim 6, wherein the switching unit comprises a switching transistor.

8. The voltage-following series power supply circuit according to claim 7, wherein the switching transistor is a PMOS switching transistor.

9. The voltage-following series power supply circuit according to claim 1, further comprising a voltage booster power supply module connected between the power supply end and the voltage following module.

10. A hash board for a computing device, comprising one or more of voltage-following series power supply circuits, wherein, each of the voltage-following series power supply circuits comprising:
    a power supply end and a ground end;
    a power supply module comprising an input end connected to the power supply end, and an output end for providing a power supply to two or more to-be-powered chips,
    the power supply module and the to-be-powered chips connected in series between the power supply end and the ground end; and
    at least one auxiliary power supply module for supplying an auxiliary power supply to the to-be-powered chips,
    wherein a voltage following module is further connected between the power supply end and the auxiliary power supply module for adjusting a voltage of the auxiliary power supply;
    wherein the voltage following module comprises a power supply input end, a ground input end, a power supply output end, a comparing amplifier unit, a sampling unit, a reference voltage generating unit and a switching unit;
    the switching unit is connected to the power supply input end and the power supply output end, and the comparing amplifier unit controls the switching unit to turn on or turn off.

11. A computing device, comprising a power supply plate, a control board, a connection board, a radiator and a plurality of hash boards, the control board connected to the hash boards through the connection board, the radiator provided around the hash boards, the power supply plate for supplying a power supply to the connection board, the control board, the radiator and the hash boards, the hash board comprises one or more of voltage-following series power supply circuits wherein, each of the voltage-following series power supply circuits comprising:
    a power supply end and a ground end;
    a power supply module comprising an input end connected to the power supply end, and an output end for providing a power supply to two or more to-be-powered chips,
    the power supply module and the to-be-powered chips connected in series between the power supply end and the ground end; and
    at least one auxiliary power supply module for supplying an auxiliary power supply to the to-be-powered chips,
    wherein a voltage following module is further connected between the power supply end and the auxiliary power supply module for adjusting a voltage of the auxiliary power supply;
    wherein the voltage following module comprises a power supply input end, a ground input end, a power supply output end, a comparing amplifier unit, a sampling unit, a reference voltage generating unit and a switching unit;

the switching unit is connected to the power supply input end and the power supply output end, and the comparing amplifier unit controls the switching unit to turn on or turn off.

12. The computing device according to claim 11, wherein the computing device is configured to operation of mining virtual digital currency.

\* \* \* \* \*